United States Patent
Kim et al.

(10) Patent No.: US 10,826,326 B2
(45) Date of Patent: Nov. 3, 2020

(54) PORTABLE TERMINAL HAVING WIRELESS CHARGING MODULE

(71) Applicant: SAMSUNG ELECTRONICS CO., LTD., Suwon-si, Gyeonggi-do (KR)

(72) Inventors: Ki-Hyun Kim, Suwon-si (KR); Jin-Hyoung Park, Wonju-si (KR); Ki-Ho Kim, Seoul (KR); Se-Ho Park, Suwon-si (KR); Young-Min Lee, Yongin-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 80 days.

(21) Appl. No.: 15/925,627

(22) Filed: Mar. 19, 2018

(65) Prior Publication Data
US 2018/0212473 A1 Jul. 26, 2018

Related U.S. Application Data

(63) Continuation of application No. 14/234,912, filed as application No. PCT/KR2012/007492 on Sep. 19, 2012, now Pat. No. 9,948,126.

(30) Foreign Application Priority Data

Sep. 30, 2011 (KR) .................. 10-2011-0099865
Sep. 12, 2012 (KR) .................. 10-2012-0101541

(51) Int. Cl.
*H02J 7/00* (2006.01)
*H02J 50/12* (2016.01)
(Continued)

(52) U.S. Cl.
CPC ............. *H02J 50/12* (2016.02); *H01Q 1/243* (2013.01); *H02J 7/025* (2013.01); *H02J 50/70* (2016.02); *H04B 1/3883* (2013.01); *H02J 7/0042* (2013.01)

(58) Field of Classification Search
CPC .......... H01Q 1/243; H01Q 13/10; H01Q 1/38; H01Q 7/00; H01Q 21/28; H01Q 5/371;
(Continued)

(56) References Cited

U.S. PATENT DOCUMENTS 8,754,815 B2 6/2014 Leem
8,766,484 B2 7/2014 Baarman et al.
(Continued)

FOREIGN PATENT DOCUMENTS

EP 1 686 651 8/2006
JP 5773224 9/2015
(Continued)

OTHER PUBLICATIONS

PCT/ISA/237 Written Opinion dated Dec. 12, 2012 in PCT/KR2012/007492.
(Continued)

*Primary Examiner* — Binh C Tat
(74) *Attorney, Agent, or Firm* — Nixon & Vanderhye, P.C.

(57) ABSTRACT

A portable terminal is provided, including a cover member which is detachably provided at a rear surface of a main body of a terminal, a resonant antenna for a reception unit provided inside of the cover member, a reception circuit unit provided inside of the main body, and a connection unit for connecting the resonant antenna for a reception unit with the reception circuit unit. The portable terminal efficiently receives the signal power provided from a charger by arranging the resonant antenna inside of the cover member, and minimizes the thickness of the portable terminal by providing the reception circuit unit inside of the main body of the terminal.

18 Claims, 4 Drawing Sheets

(51) Int. Cl.
*H02J 50/70* (2016.01)
*H01Q 1/24* (2006.01)
*H04B 1/3883* (2015.01)
*H02J 7/02* (2016.01)

(58) Field of Classification Search
CPC ........ H01Q 1/273; H04M 1/026; H02J 50/10;
H02J 50/12; H02J 50/70; H02J 50/80;
H02J 50/90; H04R 2225/51; H04R 2225/57
USPC .................................................. 320/106–115
See application file for complete search history.

(56) References Cited

U.S. PATENT DOCUMENTS

| | | | |
|---|---|---|---|
| 2006/0205381 | A1 | 9/2006 | Beart et al. |
| 2007/0216348 | A1 | 9/2007 | Shionoiri |
| 2009/0284082 | A1 | 11/2009 | Mohammadian |
| 2010/0194206 | A1 | 8/2010 | Burdo |
| 2011/0012796 | A1 | 1/2011 | Kim et al. |
| 2011/0263300 | A1 | 10/2011 | Nishizono |
| 2012/0013510 | A1 | 1/2012 | Yagi |
| 2012/0091949 | A1* | 4/2012 | Campanella ............ H01F 38/14 320/108 |
| 2012/0091950 | A1* | 4/2012 | Campanella ............ H02J 5/005 320/108 |
| 2012/0153893 | A1* | 6/2012 | Schatz ................... H02J 50/50 320/108 |
| 2012/0268328 | A1 | 10/2012 | Kim |
| 2013/0043833 | A1 | 2/2013 | Katz et al. |

FOREIGN PATENT DOCUMENTS

| | | |
|---|---|---|
| KR | 10-2005-0097010 | 10/2005 |
| KR | 10-2009-0055408 | 6/2009 |
| KR | 10-2009-0131746 | 12/2009 |
| KR | 10-2010-0012944 | 2/2010 |
| KR | 10-2010-0120057 | 11/2010 |
| KR | 10-1243592 | 3/2013 |
| KR | 10-1622606 | 5/2016 |
| WO | 2012/061378 | 5/2012 |

OTHER PUBLICATIONS

PCT/ISA/210 Search Report dated Dec. 12, 2012 in PCT/KR2012/007492.

* cited by examiner

PORTABLE TERMINAL HAVING WIRELESS CHARGING MODULE

CROSS-REFERENCE TO RELATED APPLICATIONS

This application is a continuation of U.S. application Ser. No. 14/234,912, filed on Jan. 24, 2014, which is a national phase entry of PCT/KR2012/007492, filed on Sep. 19, 2012, which designates the United States and claims priority to Korean Patent Application No. 10-2011-0099865, filed Sep. 30, 2011 and Korean Patent Application No. 10-2012-0101541, filed on Sep. 13, 2012. The contents of each of these applications are incorporated herein in their entirety.

BACKGROUND OF THE INVENTION

1. Field of the Invention

The present invention relates generally to a portable terminal, and more particularly, to a portable terminal provided with a wireless charging module.

2. Description of the Related Art

Portable terminals, such as a cellular phone and a smart phone, continue to grow in terms of functions as multimedia services are expanded. In addition, as various application programs are provided, user interface environments are developed for user convenience and to satisfy various user preferences.

Portable terminals generally include bar-type, folder-type, sliding-type, and swing-type terminals. When mobile communications such as voice and short message transmissions were principal functions, folder-type and slider-type terminals were predominant in the market. However, enlarged display devices of portable terminals have increased as multimedia services have progressed. Accordingly, physical keypads have generally been replaced by a touch screen function, which improves the portability of a portable terminal since a display device may be enlarged and the portable terminal thickness may be reduced.

In addition, a portable terminal is provided with antenna devices that enable communication in various frequency bands such as a DMB (Digital Multimedia Broadcasting), a LAN (Local Area Network), an NFC (Near Field Communication), and a Bluetooth® antenna in addition to an antenna device for a wireless communication function. Recently, portable terminals have been equipped with an antenna and a module that provides a mobile charging function.

FIG. 1 illustrates a portable terminal 100. In particular, FIG. 1 illustrates a configuration provided with a wireless charging module that includes a receiving-side resonant antenna 131 providing a wireless charging function and a receiving circuit unit provided on a substrate 133.

As illustrated in FIG. 1, the terminal 100 includes a battery-mounting groove 119 formed on a back surface of a body 101, and a camera module 117 provided at a side of the battery-mounting groove 119. The battery-mounting groove 119 is concealed by a cover member 102 detachably provided on the back surface of the body 101. A user may open the battery-mounting groove 119 by removing the cover member 102 as needed. In addition, the cover member 102 is provided with an opening 127 that exposes the camera module 117 so that a subject may be photographed even when the cover member 102 is coupled to the body 101.

A wireless charging module is provided on the inner surface of the cover member 102. The wireless charging module includes a receiving-side resonant antenna 131 and a receiving circuit unit. A second cover member 141 may be provided on the inner surface of the cover member 102 so as to provide a stable installment structure of the receiving-side resonant antenna 131 and the receiving circuit unit.

The receiving-side resonant antenna 131 produces signal power by a magnetic induction or magnetic resonance phenomenon, according to an electromagnetic field generated at a primary coil of a charger (not illustrated), and transmits the signal power to the receiving circuit unit. A connection piece 131a connected to the receiving circuit unit is formed at a side of the receiving-side resonance antenna 131, which may be attached on the inner surface of the cover member 102. In the portable terminal 100 illustrated in FIG. 1, however, the second cover member 141 is coupled to the cover member 102 when the receiving-side resonant antenna 131 is attached to the inner surface of the second cover member 141. As a result, the receiving-side resonant antenna 131 is disposed on the inner surface of the cover member 102.

Thus, the terminal 100 is provided with an electromagnetic shielding member 139 in order to cut off an electromagnetic field effect exerted on circuit devices inside the body or a battery pack, formed around the receiving-side resonance antenna 131. The electromagnetic shielding member 139 is attached on the cover member 102 and interposed between the receiving-side resonant antenna 131 and the body 101. Since the receiving-side resonant antenna 131 is directly attached to the second cover member 141, the receiving-side resonant antenna 131 may be attached on the electromagnetic shielding member 139 after the electromagnetic shielding member 139 is attached to the second cover member 141 in advance.

Since the receiving circuit unit includes the wireless charging circuit provided on the substrate 133, the receiving circuit unit converts signal power received through the receiving-side resonant antenna 131 into charging power, and provides the charging power to the battery pack mounted on the body 101. A connection portion 131b corresponding to the connection piece 131a is provided at a side of the substrate 133. The receiving circuit unit is also attached to the second cover member 141 together with the receiving-side resonant antenna 131. When the receiving-side resonant antenna 131 and the receiving circuit unit are attached to the second cover member 141, the connection piece 131a and the connection portion 131b are engaged with each other to be electrically connected.

A flexible printed circuit board 135 is disposed at a side of the receiving circuit unit and includes a connection pad 137 at one end. The charging power provided from the receiving circuit unit is transmitted to the body 101 through the flexible printed circuit board 135 and the connection pad 137. The body 101 is provided with connection terminals 115 at a side of the battery-mounting groove 119. When the cover member 102 is coupled to the body 101, the connection pad 137 is connected with the connection terminals 115, thereby providing the charging power to the body 101, in particular, to the battery pack mounted on the body 101.

FIG. 2 schematically illustrates a configuration of the wireless charging module disposed on the cover member 102. In FIG. 2, the height h of the wireless charging module, i.e. the thickness is illustrated. It is noted that the second cover member 141 is not illustrated in FIG. 2, and the wireless charging module is illustrated as being directly attachable to the cover member 102.

The receiving-side resonance antenna 131 and the electromagnetic shielding member 139 are stacked on the inner surface of the cover member 102. The receiving circuit unit includes circuit elements 133a such as a charging control circuit chip and an inductor, which are mounted on the substrate 133. The thicknesses of the receiving-side resonant antenna 131 and the substrate 133 are about 0.35 mm, the thickness of the electromagnetic shielding member 139 is about 0.6 mm, and the maximum height of the circuit elements 133a is about 1.25 mm. Accordingly, the maximum thickness of the wireless charging module from the inner surface of the cover member 102 is about 1.6 mm.

As described above, as multimedia functions of portable terminals have expanded, display devices have been enlarged and efforts have been made to reduce the thickness and weight of the portable terminals. A wireless charging module may enhance the convenience to charge a portable terminal but increases the thickness of the portable terminal. Particularly, slimmer portable terminals having a thickness of not more than 10 mm will have compromised size when equipped with a wireless charging module having a thickness of about 1.6 mm.

SUMMARY OF THE INVENTION

The present invention has been made to address at least the above problems and/or disadvantages and to provide at least the advantages described below. Accordingly, an aspect of the present invention provides a portable terminal that is equipped with a wireless charging module including an additional antenna, particularly, a receiving-side resonant antenna, which improves user convenience.

In addition, the present invention provides a portable terminal having a decreased thickness for portability purposes, even though the portable terminal is equipped with a wireless charging module.

According to an aspect of the present invention, a portable terminal includes a cover member that is detachably provided on a back surface of a body of the portable terminal, a receiving-side resonant antenna provided on an inner surface of the cover member, a receiving circuit unit accommodated inside the body of the mobile terminal, and a connection device that electrically connects the receiving-side resonant antenna and the receiving circuit unit.

According to another aspect of the present invention, a portable terminal includes a body that is formed with a battery-mounting groove on a back surface of the body, a cover member that is detachably provided on a back surface of a body of the portable terminal to open and close the battery-mounting groove, a receiving-side resonant antenna provided on an inner surface of the cover member, and a receiving circuit unit accommodated inside the body. When the cover member is coupled to the body, the receiving-side resonant antenna is electrically connected to the receiving circuit unit, and the receiving circuit unit includes a wireless charging circuit.

DETAILED DESCRIPTION OF EMBODIMENTS OF THE INVENTION

Hereinafter, various embodiments of the present invention will be described with reference to the accompanying drawings. A detailed description of known functions and configurations incorporated herein will be omitted for the sake of clarity and conciseness.

The portable terminal of the present invention may efficiently receive signal power provided from a charger since the receiving-side resonant antenna is arranged on the inner surface of the cover member. Since the receiving circuit unit is accommodated inside the body of the terminal, the thickness of the portable terminal is minimized. Accordingly, the present invention enables miniaturization of the portable terminal while improving convenience in use by enabling wireless charging.

Figure 3:
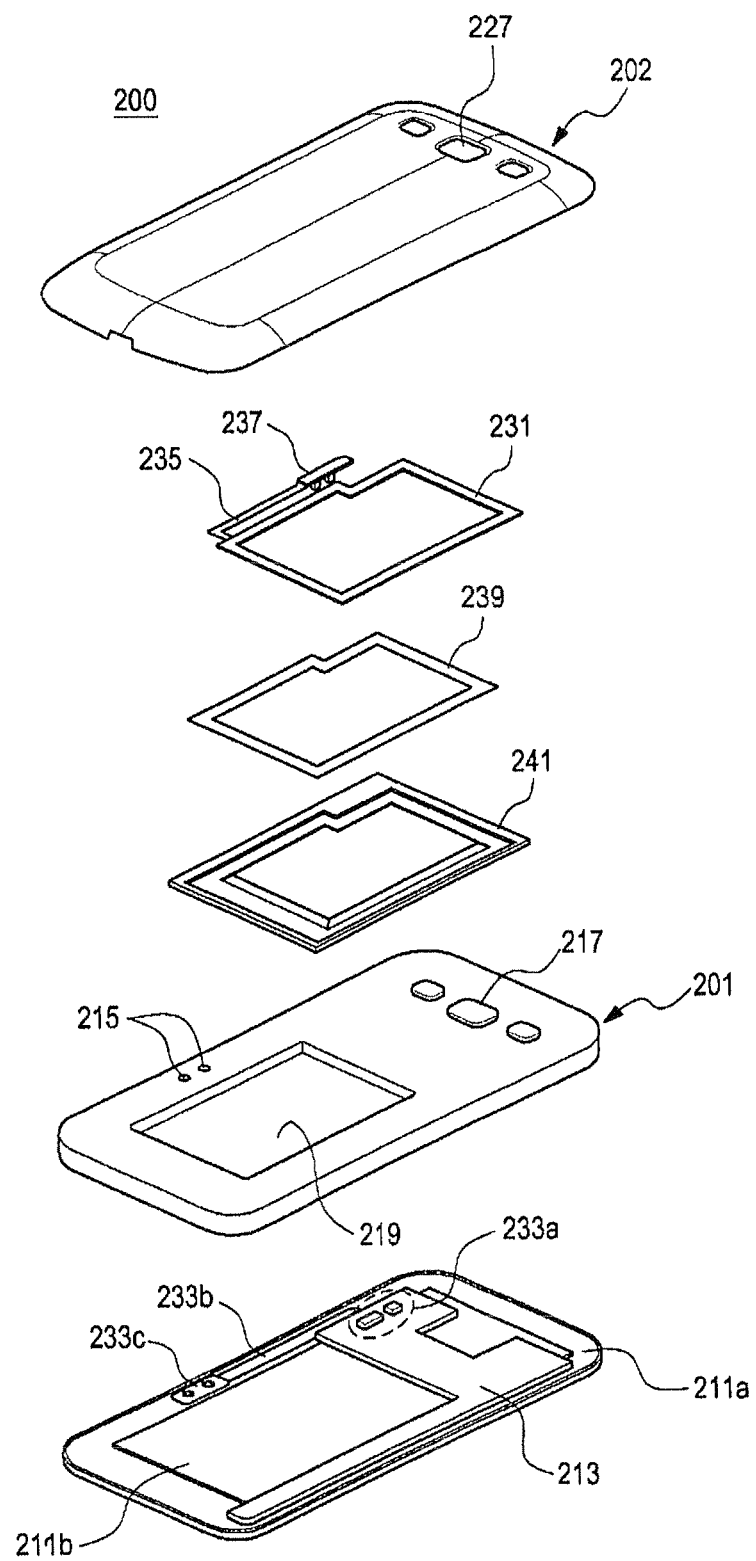
FIG. 3 illustrates a portable terminal, according to an embodiment of the present invention.
Figure 4:
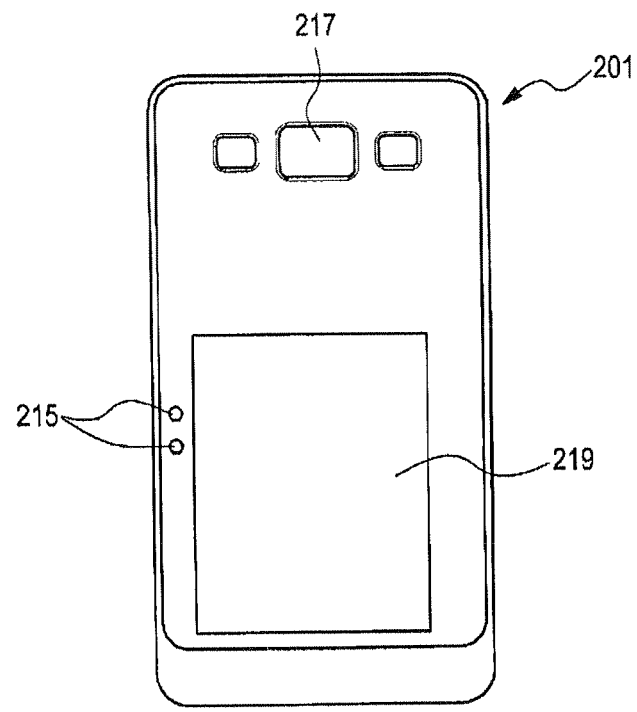
FIG. 4 illustrates the back surface of the body of the portable terminal illustrated in FIG. 3, according to an embodiment of the present invention.
Figure 5:
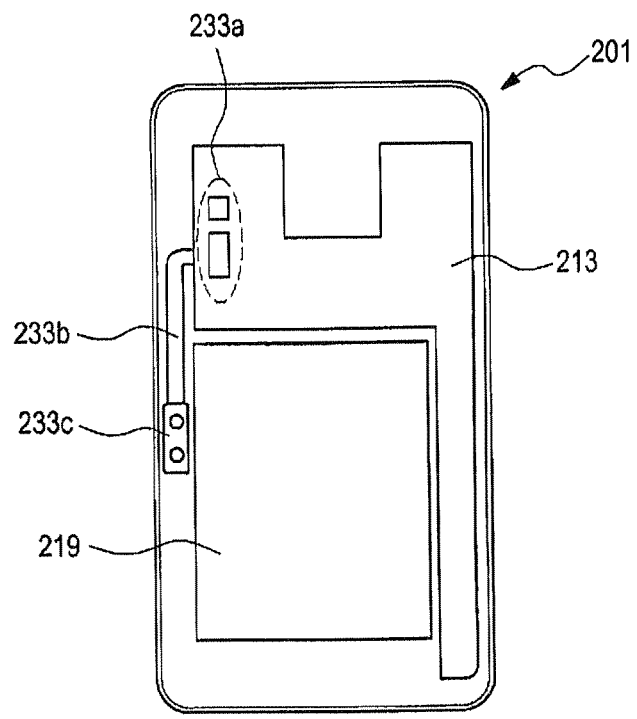
FIG. 5 illustrates an appearance of the body of the portable terminal from which the rear case is removed, according to an embodiment of the present invention.

FIG. 3 illustrates a portable terminal 200 according to an embodiment of the present invention. FIG. 4 illustrates the back surface of the body 201 of the portable terminal illustrated in FIG. 3. FIG. 5 illustrates an appearance of the body 201 of the portable terminal from which the rear case is removed.

As illustrated in FIGS. 3 to 5, the portable terminal 200 includes a cover member 202 that is detachably provided on a back surface of a body 201 of the portable terminal 200, a receiving-side resonant antenna 231 attached to an inner surface of the cover member 201, a receiving circuit unit 233a accommodated inside the body 201, and a connection device that electrically connects the receiving-side resonant antenna 231 and the receiving circuit unit 233a. The receiving-side resonant antenna 231 receives signal power from the outside and the received signal power is converted into charging power through the receiving circuit unit 233a. In other words, the receiving-side resonant antenna 231 and the receiving circuit unit 233a constitutes a wireless charging module.

The body 201 includes a window member 211a coupled to a front surface of the body 201 and accommodates a main circuit board 213 and a display module 211b. The back surface of the body 201 is formed with a battery-mounting groove 219, into a side of which a camera module 217 may be installed. The display module 211b is installed to face the inner surface of the window member 211a, and the main circuit board 213 is positioned inside the display module 211b. The receiving circuit unit 233a accommodated in the body 201 may be configured on a board provided separately from the main circuit board 213.

In an embodiment of the present invention, the receiving circuit unit 233a is configured by circuit elements such as a charging control circuit chip or an inductor, which are mounted on the main circuit board 213. In that event, the receiving circuit unit 233a, which is accommodated in a space that is already secured inside the body 201, does not increase the thickness of the portable terminal 200.

A flexible printed circuit board 233b connected to the receiving circuit unit 233a is arranged at a side edge in the inner surface of the window member 211a of the main circuit board 213, and a connection terminal 233c is provided at an end of the flexible printed circuit board 233b.

The connection terminal 233c is exposed to the outside through electrode holes 215 formed at a side of the battery-mounting groove 219 on the back surface of the body 201.

Although the electrode holes 215 and the connection terminal 233c are configured to be exposed to the outside of the body 201, both the electrode holes 215 and the connection terminal 233c are concealed by the cover member 202 when the cover member 202 is coupled to the body 201. The cover member 202 is detachably provided on the back surface of the body 201 so as to conceal the battery-mounting groove 219 and the connection terminal 233c, and is provided with an opening 227 to provide a photographing path by exposing the camera module 217.

The receiving-side resonant antenna 231 is a type of resonator (RX resonator) that generates signal power by a magnetic induction or magnetic resonance phenomenon, according to an electromagnetic field generated at a primary coil of a charger (not illustrated), and transmits the signal power to the receiving circuit unit 233a. The receiving-side resonant antenna 231 takes a form of a flat plate or a film that may be attached to the inner surface of the cover member 202, and may be configured in various patterns using a copper plate or a conductive material such as silver or gold. The receiving-side resonant antenna 231 receives a radio frequency, i.e., the signal power, and transmits the signal power to the receiving circuit unit 233a. In other words, when power is applied to the primary coil of the charger (not illustrated), the receiving-side resonant antenna 231 is operated as a secondary coil to generate and provide an induced power to the receiving circuit unit 233a. When the receiving circuit unit 233a includes a wireless charging circuit configured by circuit elements such as a charging control circuit chip and an inductor, the receiving circuit unit 233a may convert the signal power provided from the receiving-side resonant antenna 231 into charging power so as to charge a battery pack coupled to the battery-mounting groove 219.

A second flexible printed circuit board 235 and a connection pad 237 are provided at an end of the second flexible printed circuit board 235 at a side of the receiving-side resonant antenna 231. The connection pad 237 is provided to correspond to the connection terminal 233c so as to connect the receiving-side resonant antenna 231 to the receiving circuit unit 233a when the cover member 202 is coupled to the body 201. That is, the connection pad 237 and the connection terminal 233c are practically used as a connection device that connects the receiving-side resonant antenna 231 to the receiving circuit unit 233a.

The receiving-side resonant antenna 231 is attached to the inner surface of the cover member 202, and then an electromagnetic shielding member 239 is coupled to the inner surface of the cover member 202. Accordingly, the electromagnetic shielding member 239 is interposed between the receiving-side resonant antenna 231 and the body 201 and suppresses an electromagnetic field or electromagnetic waves generated around the receiving-side resonant antenna 231 from affecting the inside of the body 201.

In that event, the portable terminal 200 may further include a second cover member 241. Various antennas such as a LAN, Bluetooth®, and NFC antenna are included in the cover member 202, in addition to the receiving-side resonant antenna 231. The second cover member 241 may be attached to the inner surface of the cover member 202 to conceal the various antennas. The receiving-side resonant antenna 231 and the electromagnetic shielding member 239 may be attached to the second cover member 241. In that event, the electromagnetic shielding member 239 is first attached to the second cover member 241, and the receiving-side resonant antenna 231 is attached on the electromagnetic shielding member 239.

The second cover member 241 is attached to the cover member 202 when the receiving-side resonant antenna 231 faces the inner surface of the cover member 202. That is, although in an embodiment, the second cover member 241 is separate from the electromagnetic shielding member 239, the second cover member 241 itself may be configured as the electromagnetic shielding member or only the electromagnetic shielding member 239 may be interposed between the receiving-side resonant antenna 231 and the back side of the body 201. In addition, although the second cover member 241 is shaped as a synthetic resin mold or by processing a metal plate or the like, the second cover member 241 may be made of a film or a sheet having an electromagnetic shielding characteristic.

Figure 1:
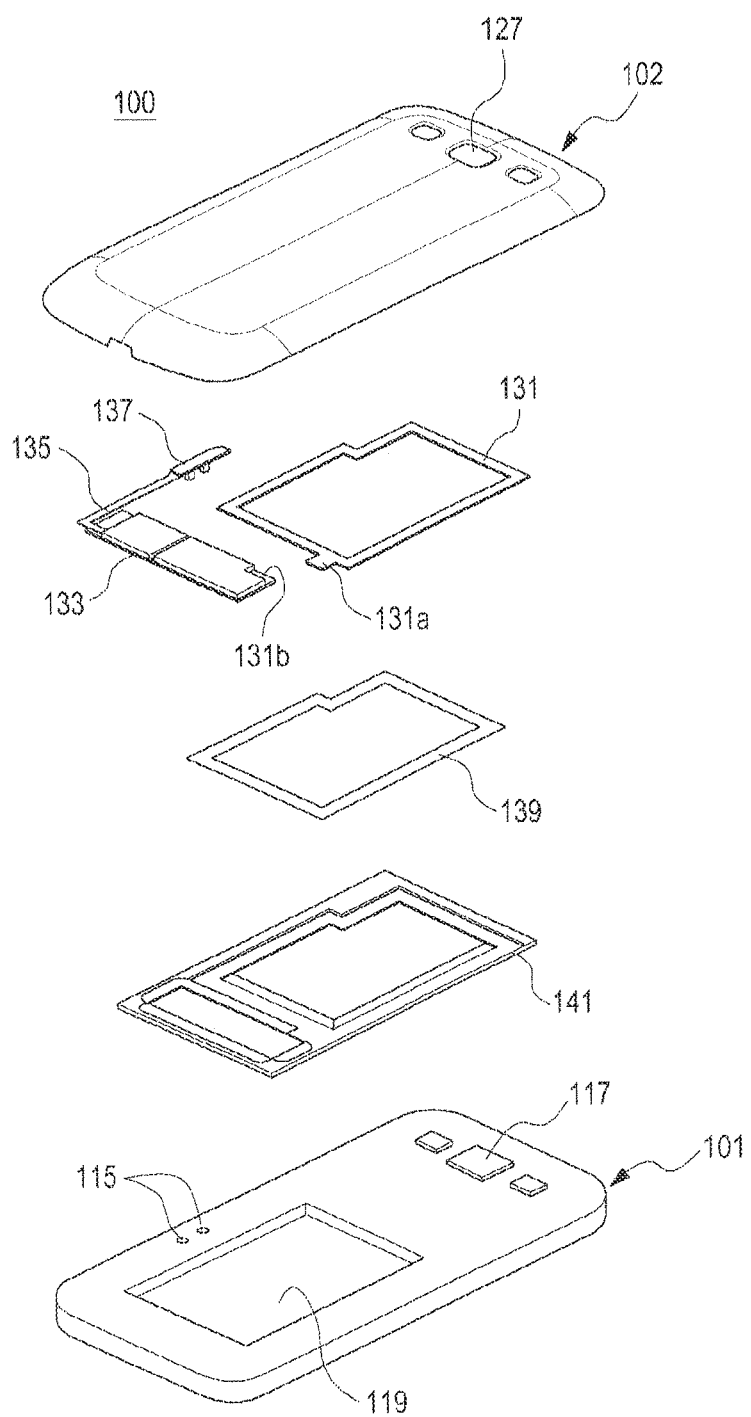
FIG. 1 illustrates a portable terminal according to the prior art.
Figure 2:
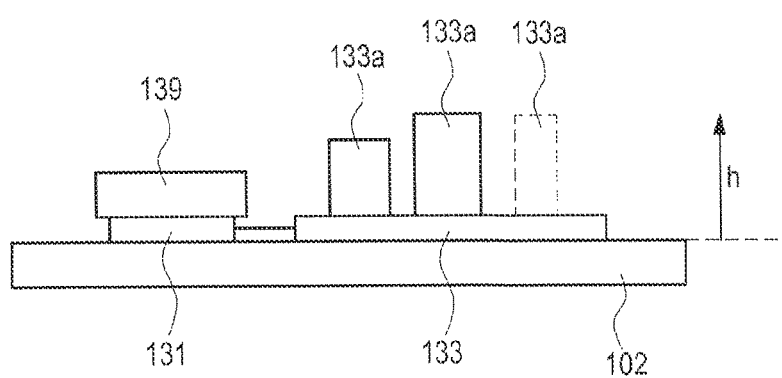
FIG. 2 illustrates a configuration of a wireless charging module of the portable terminal illustrated in FIG. 1.

When the receiving-side resonant antenna, the electromagnetic shielding member, and the receiving circuit unit for example, are fabricated with the conventional standards as illustrated in FIG. 1, the receiving circuit unit 233a does not practically affect the thickness of the portable terminal 200 since the receiving circuit unit 233a is accommodated inside the body 201. The conventional wireless charging module causes the thickness of a portable terminal to be increased up to 1.6 mm when it is incorporated in the portable terminal. However, the wireless charging module according to an embodiment of the present invention suppresses the increase of the thickness to be less than 1 mm, more specifically, to 0.95 mm. Accordingly, the present invention is advantageous in enhancing portability and convenience of a portable terminal, by incorporating a wireless charging function in the portable terminal.

While the present invention has been shown and described with reference to certain embodiments thereof, it will be understood by those skilled in the art that various changes in form and details may be made therein without departing from the spirit and scope of the present invention as defined by the appended claims.

The invention claimed is:

1. An electronic device, comprising:
   a housing;
   an antenna provided at an inside of the housing and configured to receive a first power based on an electromagnetic field provided from an external charger device;
   a circuit board including a receiving circuit, wherein the receiving circuit is configured to convert the first power received by the antenna into a second power for charging a battery of the electronic device; and
   a connection circuit configured to electrically connect the antenna and the receiving circuit,
   wherein the connection circuit comprises:
   a connection pad located at one end of a flexible printed circuit board (FPCB) and electrically connected to the antenna; and
   a connection terminal configured to physically contact the connection pad and electrically connected to the receiving circuit.

2. The electronic device of claim 1, wherein the antenna is configured as a resonator.

3. The electronic device of claim 1, wherein the antenna is attached by an electromagnetic shield to the inside of the housing.

4. The electronic device of claim 1, further comprising another antenna for near field communication at the inside of the housing.

5. The electronic device of claim 4, wherein the another antenna is concealed by an electromagnetic shield which attaches the antenna to the inside of the housing.

6. The electronic device of claim 1, wherein the housing includes a first member and a second member, and the first member of the body accommodates a display.

7. The electronic device of claim 1, wherein a camera is provided on the back surface of the housing, and an opening is provided in the housing for a photographing path of the camera.

8. The electronic device of claim 1, wherein the first power received by the antenna is provided in a form of electromagnetic induction, electromagnetic resonance, and electromagnetic waves.

9. An electronic device comprising:
- a housing including a body and a cover detachably attached to the body;
- an antenna disposed at an inner side of the cover and for receiving power based on an electromagnetic field provided from an external device;
- a circuit board disposed in the body and including a receiving circuit, the receiving circuit is configured to convert the power received by the antenna in a charging power for a battery of the electronic device; and
- a connection circuit configured to electrically connect the antenna and the receiving circuit,
- wherein the connection circuit comprises:
- a connection pad disposed the inner side of the cover and electrically connected to the antenna; and
- a connection terminal disposed on the body and electrically connected to the receiving circuit, and
- wherein the connection terminal is configured to physically contact the connection pad.

10. The electronic device of claim 9, comprising a smart phone.

11. The electronic device of claim 9, wherein the antenna is attached to an inner-side surface of the cover by a shield.

12. The electronic device of claim 9, wherein the antenna is configured as a resonator.

13. The electronic device of claim 9, further comprising an electromagnetic shield for electromagnetically shielding the antenna, and the antenna is attached by the electromagnetic shield to the inner-side surface of the cover.

14. The electronic device of claim 9, further comprising a display module disposed in the interior space of the body.

15. The electronic device of claim 9, further comprising another antenna for near field communication at the inner-side surface of the cover.

16. The electronic device of claim 15, further comprising a shield configured to attach the antenna to an inner-side surface of the cover, and
wherein the other antenna is concealed by the shield.

17. The electronic device of claim 9, wherein the body includes a first member and a second member, the first member of the body accommodates a display.

18. The electronic device of claim 9, wherein the power received by the antenna is provided in a form of electromagnetic induction, electromagnetic resonance, and electromagnetic waves.

* * * * *